US012476377B2

(12) United States Patent
Lin et al.

(10) Patent No.: US 12,476,377 B2
(45) Date of Patent: Nov. 18, 2025

(54) BALANCED DIPOLE ANTENNA HAVING SYMMETRICAL ARCHITECTURE

(71) Applicant: NATIONAL TAIWAN UNIVERSITY, Taipei (TW)

(72) Inventors: Yi-Cheng Lin, Taipei (TW); Chung-En Tsai, Taichung (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 43 days.

(21) Appl. No.: 18/755,374

(22) Filed: Jun. 26, 2024

(65) Prior Publication Data

US 2025/0323421 A1 Oct. 16, 2025

(30) Foreign Application Priority Data

Apr. 15, 2024 (TW) ................................ 113113891

(51) Int. Cl.
*H01Q 9/06* (2006.01)
*H01Q 9/16* (2006.01)

(52) U.S. Cl.
CPC ............... *H01Q 9/065* (2013.01); *H01Q 9/16* (2013.01)

(58) Field of Classification Search
CPC ................................. H01Q 9/065; H01Q 9/16
See application file for complete search history.

(56) References Cited

U.S. PATENT DOCUMENTS 11,664,595 B1 * 5/2023 Wong ..................... H01Q 21/08 343/767
2006/0097918 A1 * 5/2006 Oshiyama ................ H01Q 1/36 343/700 MS
2023/0070175 A1 * 3/2023 Moallem .............. H01Q 9/0407

* cited by examiner

*Primary Examiner* — Dieu Hien T Duong
(74) *Attorney, Agent, or Firm* — Li & Cai Intellectual Property (USA) Office

(57) ABSTRACT

A balanced dipole antenna includes a feeding metal member, a first radiating metal member, a second radiating metal member and a first ground metal member. The feeding metal member includes a first feeding part and a second feeding part, the first feeding part is connected to a feeding terminal, and the second feeding part is connected to a selective terminal. The first radiating metal member is disposed adjacent to the first feeding part. The second radiating metal member is disposed adjacent to the second feeding part. The feeding metal member, the feeding terminal, the selective terminal, and the first ground terminal to the fourth ground terminal form a balun transmission device, and the balun transmission device, the first radiating metal member and the second radiating metal member form a symmetrical structure.

10 Claims, 16 Drawing Sheets

BALANCED DIPOLE ANTENNA HAVING SYMMETRICAL ARCHITECTURE

CROSS-REFERENCE TO RELATED PATENT APPLICATION

This application claims the benefit of priority to Taiwan Patent Application No. 113113891, filed on Apr. 15, 2024. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an antenna, and more particularly to a balanced dipole antenna with a symmetrical structure that can achieve high bandwidth and miniaturization.

BACKGROUND OF THE DISCLOSURE

The magnetic-electric dipole antenna is a complementary antenna that has an electric dipole antenna and a magnetic dipole antenna being orthogonally disposed with each other. When a radiation pattern of the electric dipole antenna is superimposed on a radiation pattern of the magnetic dipole antenna, the two have the same and symmetrical radiation pattern on the E-plane and the H-plane. When two resonant frequency ranges of the magneto-electro-dipole antenna overlap, a low back-radiation antenna is formed, and when the resonant frequencies are separated, a broadband or dual-band antenna can be achieved.

However, an existing design of magnetoelectric dipole antennas cannot meet the requirements of certain unbalanced structures, such as conversion requirements between single-end and multi-end, and the size of the existing magnetic dipole antenna still needs to be further optimized to meet the miniaturization requirements of some electronic products.

SUMMARY OF THE DISCLOSURE

In response to the above-referenced technical inadequacies, the present disclosure provides a balanced dipole antenna with a symmetrical structure that can achieve high bandwidth and miniaturization.

In order to solve the above-mentioned problems, one of the technical aspects adopted by the present disclosure is to provide a balanced dipole antenna, which includes a feeding metal member, a first radiating metal member, a second radiating metal member and a first ground metal member. The feeding metal member includes a first feeding part and a second feeding part, the first feeding part is connected to a feeding terminal, and the second feeding part is connected to a selective terminal. The first radiating metal member is disposed adjacent to the first feeding part and has a first ground terminal and a second ground terminal. The second radiating metal member is disposed adjacent to the second feeding part, and has a third ground terminal and a fourth ground terminal. The first ground metal member is disposed below the feeding metal member, the first radiating metal member and the second radiating metal member. The feeding metal member, the feeding terminal, the selective terminal, and the first ground terminal to the fourth ground terminal form a balun transmission device, and the balun transmission device, the first radiating metal member and the second radiating metal member form a symmetrical structure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
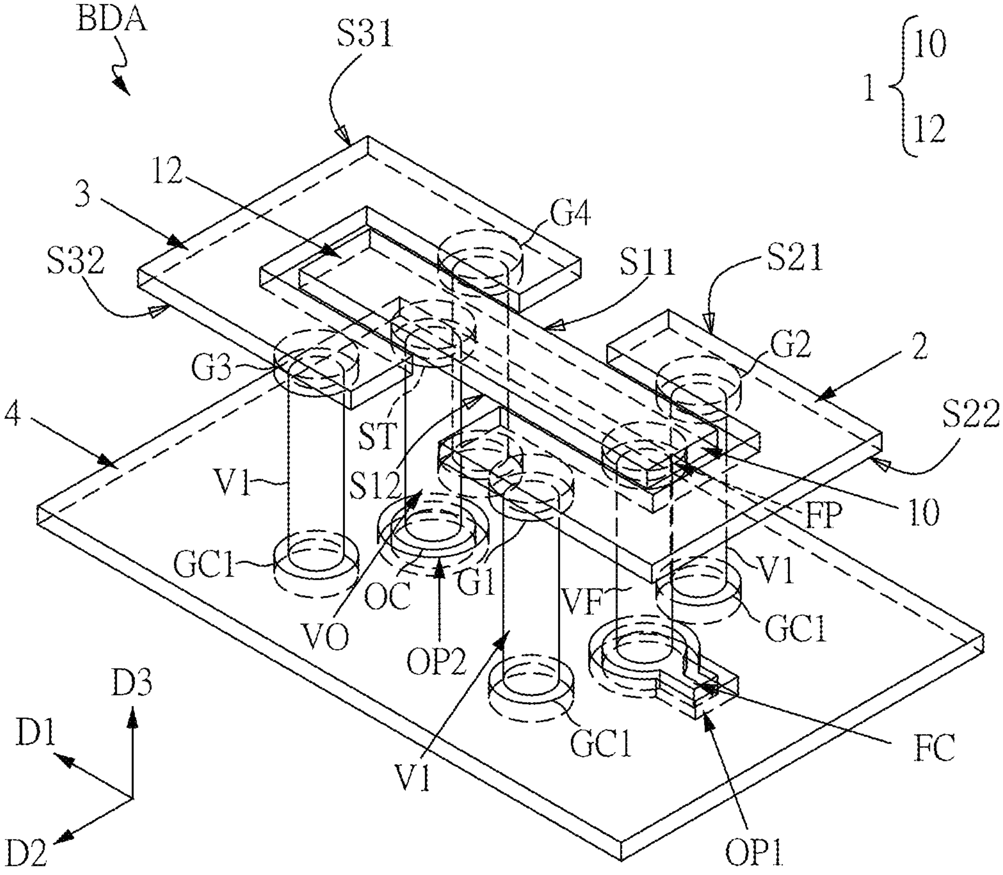
FIG. 1 is a perspective diagram of a balanced dipole antenna according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Figure 2:
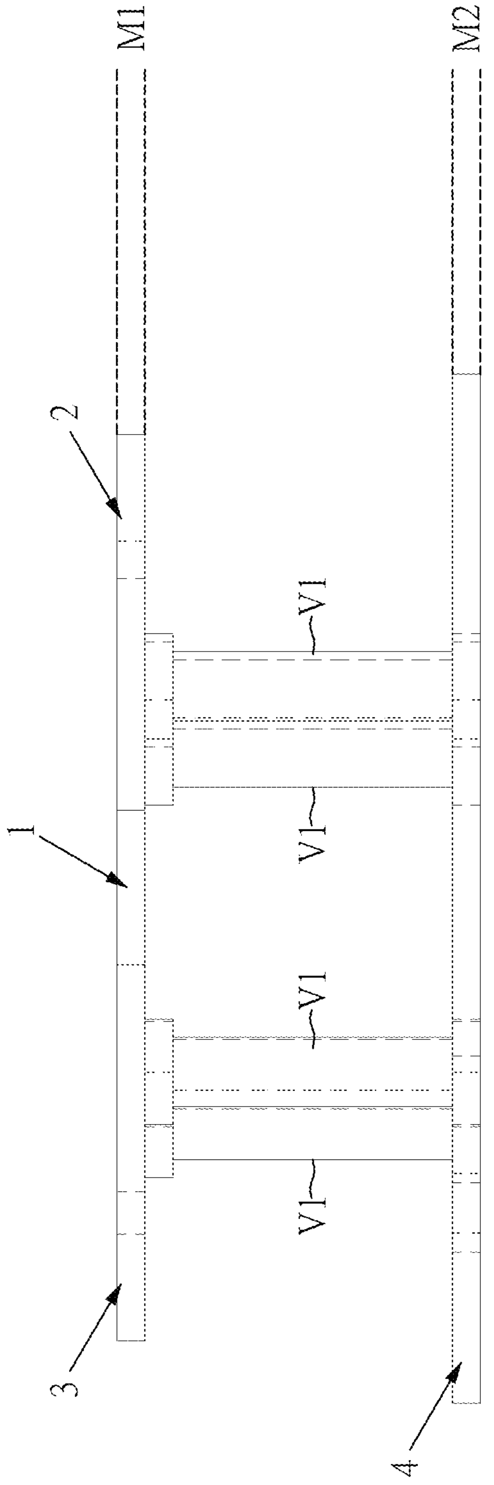
FIG. 2 is a front view schematic diagram of a balanced dipole antenna according to the first embodiment of the present disclosure.
Figure 3:
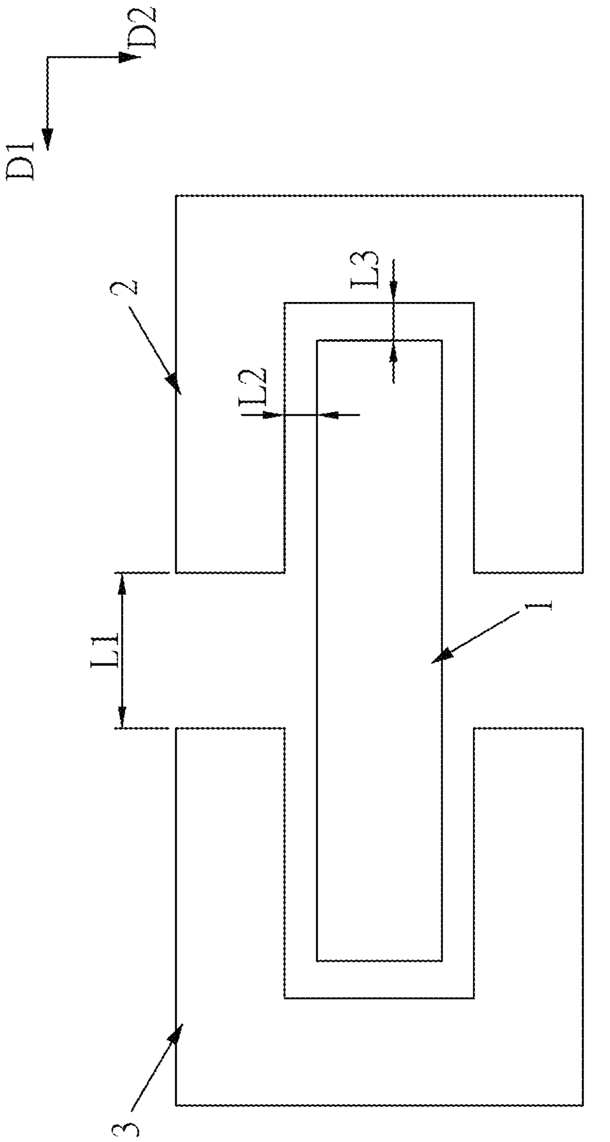
FIG. 3 is a schematic top view of a first metal layer of the first embodiment of the present disclosure.
Figure 4:
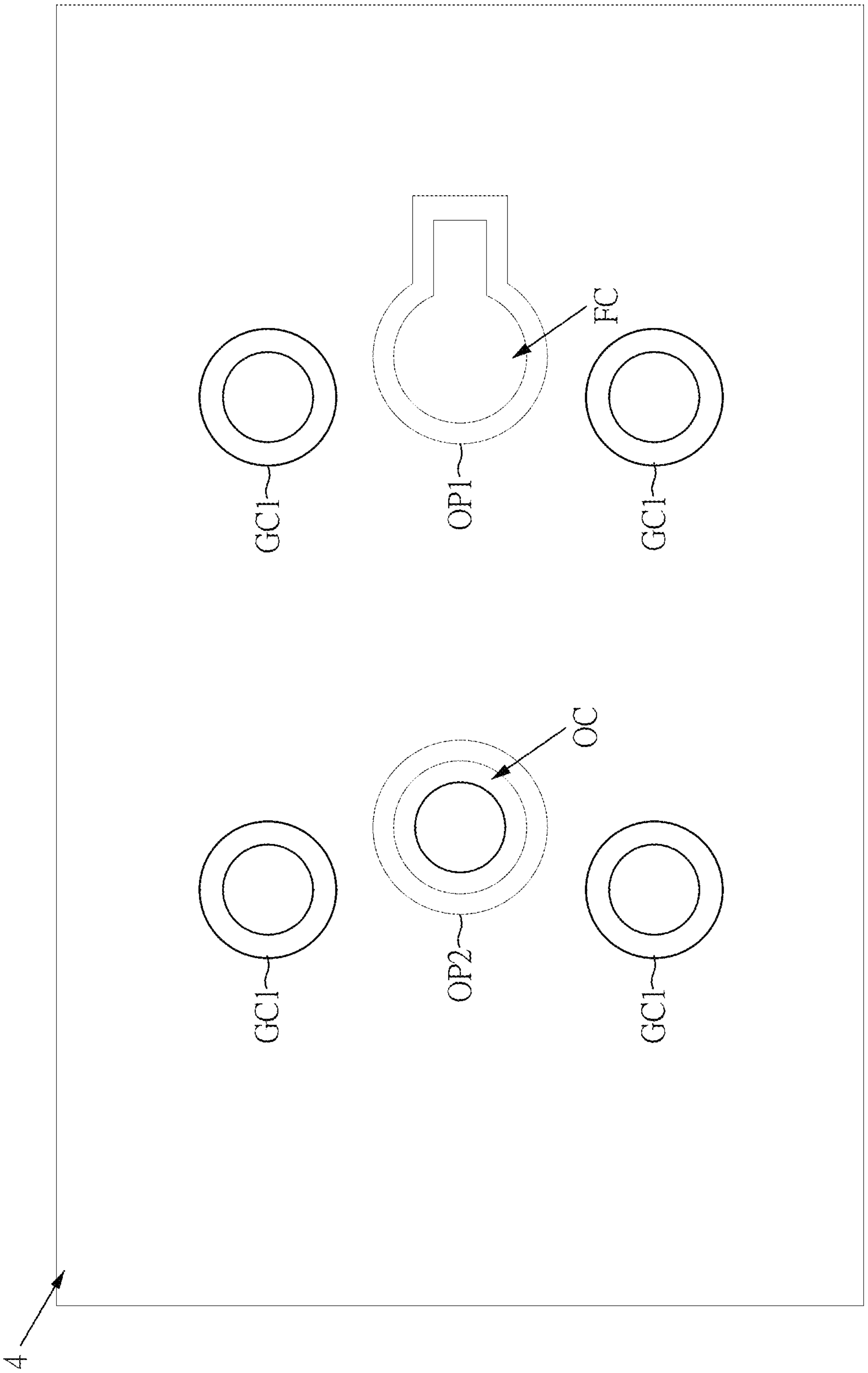
FIG. 4 is a schematic top view of a second metal layer of the first embodiment of the present disclosure.

FIG. 1 is a perspective diagram of a balanced dipole antenna according to a first embodiment of the present disclosure. FIG. 2 is a front view schematic diagram of a balanced dipole antenna according to the first embodiment of the present disclosure. FIG. 3 is a schematic top view of a first metal layer of the first embodiment of the present disclosure. FIG. 4 is a schematic top view of a second metal layer of the first embodiment of the present disclosure.

Referring to FIG. 1, the first embodiment of the present disclosure provides a balanced dipole antenna BDA capable of achieving high bandwidth and miniaturization, and the balanced dipole antenna BDA includes a feeding metal member 1, a first radiating metal member 2, a second radiating metal member 3 and a first ground metal member 4.

In the present embodiment, the feeding metal member 1 can be made of, for example, a conductive metal material, and can be a strip-shaped metal member extending along the first direction D1. The feeding metal member 1 can include a first feeding part 10 and a second feeding part 12. The first feeding part 10 is connected to the second feeding part 12. The first feeding part 10 is connected to a feeding terminal FP, and the second feeding part 12 is connected to a selective terminal ST.

Specifically, the feeding metal member 1 includes a first surface S11 and a second surface S12 facing each other, and electrical contacts serving as the feeding terminal FP and the selective terminal ST are disposed on a second surface S12. The feeding terminal FP is used to receive a feeding signal from the second surface S12 of the feeding metal member 1. In addition, the feeding terminal FP can be disposed at one end of the strip-shaped metal member, and the selective terminal ST can be disposed near the center of the strip-shaped metal member and shifted toward the other end of the strip-shaped metal member.

In addition, the first radiating metal member 2 can be made of, for example, a conductive metal material, and can have a C-shaped structure with an opening facing the first direction D1. The first radiating metal member 2 is disposed adjacent to the first feeding part 10 and has a first ground terminal G1 and a second ground terminal G2. The first radiating metal member 2 has a first surface S21 and a second surface S22 opposite to each other. The second surface S22 is provided with electrical contacts serving as the first ground terminal G1 and the second ground terminal G2.

The second radiating metal member 3 can be made of, for example, a conductive metal material, and can have a C-shaped structure with an opening facing in a direction opposite to the first direction D1 and being opposite from the first radiating metal member 2. The second radiating metal member 3 is disposed adjacent to the second feeding part 12 and has a third ground terminal G3 and a fourth ground terminal G4. The second radiating metal member 3 is similar to the first radiating metal member 2 and has a first surface S31 and a second surface S32 opposite to each other. The second surface S32 is provided with electrical contacts serving as the third ground terminal G3 and the fourth ground terminal G4.

The balanced dipole antenna BDA further includes a first ground metal member 4, which can be made of a conductive metal material and is disposed below the feeding metal member 1, the first radiating metal member 2 and the second radiating metal member 3 (along a third direction D3). Reference is made to FIG. 2. The feeding metal member 1, the first radiating metal member 2 and the second radiating metal member 3 are coplanarly arranged in a first metal layer M1, and the first ground metal member 4 is arranged in the second metal layer M2. The first metal layer M1 and the second metal layer M2 can be two conductive layers of a printed circuit board, and a dielectric layer can be arranged between the first metal layer M1 and the second metal layer M2.

However, the above example is only one feasible embodiment and is not intended to limit the present disclosure.

As shown in FIG. 1, a plurality of first ground contacts GC1 are disposed on the first ground metal member 4, and the first ground terminal G1, the second ground terminal G2, the third ground terminal G3 and the fourth ground terminal G4 are respectively connected to the plurality of first ground contacts GC1 through a plurality of first ground vias V1. For example, the first ground terminal G1, the second ground terminal G2, the third ground terminal G3 and the fourth ground terminal G4 can form a plurality of vertical projections onto the first ground metal member 4, and the vertical projections respectively overlap with the corresponding first ground contacts GC1, such that the first ground terminal G1, the second ground terminal G2, the third ground terminal G3 and the fourth ground terminal G4 can be respectively connected to the corresponding first ground contacts GC1 overlapping with the vertical projections. In the embodiment of the present disclosure, the selective terminal ST can be an open-circuit terminal or a short-circuit terminal. In FIGS. 1 to 4, the selective terminal ST is shown as an open-circuit terminal, and is thus connected to an open-circuit contact OC through an open-circuit via VO. It should be noted that the above content is only an example showing an arrangement of the first ground terminal G1, the second ground terminal G2, the third ground terminal G3, the fourth ground terminal G4 and the selective terminal ST, and the present disclosure is not limited thereto.

Reference is made to FIG. 3, which is a top view of the first metal layer. In more detail, the first radiating metal member 2 and the second radiating metal member 3 each have a C-shaped structure. Taking FIG. 3 as an example, the C-shaped structure of the first radiating metal member 2 includes a first portion 21, a second portion 22 and a third portion 23. The first portion 21 is parallel to the second portion 22 and extends along the first direction D1. The third portion 23 extends along the second direction D2 and is perpendicular to the first portion 21 and the second portion 22. Two ends of the third portion 23 are connected to the first portion 21 and the second portion 22, respectively.

Similarly, the C-shaped structure of the second radiating metal member 3 includes a first portion 31, a second portion 32 and a third portion 33. The first portion 31 is parallel to the second portion 32 and extends along the first direction D1. The third portion 33 extends along the second direction D2 and is perpendicular to the first portion 31 and the second portion 32. Two ends of the third portion 33 are connected to the first portion 31 and the second portion 32, respectively.

In addition, the first radiating metal member 2 and the second radiating metal member 3 are disposed around the feeding metal member 1 and are arranged symmetrically with respect to the feeding metal member 1, but the first radiating metal member 2, the second radiating metal member 3 and the feeding metal member 1 are not in direct contact with one another. The first portion 21 of the first radiation metal member 2 and the first portion 31 of the second radiating metal member 3 are spaced apart by a first distance L1, and the second portion 22 of the first radiating metal component 2 and the second portion 32 of the second radiating metal member 3 are also spaced apart by the first distance L1. On the other hand, the first portion 21 of the first radiating metal member 2 and the first portion 31 of the second radiating metal member 3 are each separated from the feeding metal member 1 by a second distance L2; the second portion 22 of the first radiating metal member 2 and the second portion 32 of the second radiating metal member 3 are each separated from the feeding metal member 1 by a second distance L2, and the third portion 23 of the first radiation metal member 2 and the third portion 33 of the second radiating metal member 3 are each separated from the feeding metal member 1 by a third distance L3.

It should be noted that the first distance L1, the second distance L2 and the third distance L3 can be determined according to design parameters of the balanced dipole antenna BDA. For example, a corresponding operating wavelength $\lambda 0$ can be obtained according to an operating frequency applicable to the balanced dipole antenna BDA, and the first distance L1, the second distance L2 and the third distance L3 can be determined according to the operating wavelength $\lambda 0$. In one preferred embodiment of the present disclosure, the first distance L1 can range from 0.004 to 0.05 times the operating wavelength $\lambda 0$, the second distance L2 can range from 0.004 to 0.05 times the operating wavelength $\lambda 0$, and the third distance L3 can range from 0.004 to 0.05 times the operating wavelength $\lambda 0$.

Referring to FIG. 4, the first ground metal member 4 is provided with a first opening OP1 for accommodating the feeding contact FC and a second opening OP2 for accommodating the open-circuit contact OC, and both the first opening OP1 and the second opening OP2 penetrate the first ground metal member 4. It should be noted that an edge of the first opening OP1 does not contact the feeding contact FC, and an edge of the second opening OP2 does not contact the open-circuit contact OC to ensure electrical isolation. In addition, the first feeding part 10 of the feeding metal member 1 is electrically connected to the feeding contact FC through the feeding via VF. When the selective terminal ST is an open-circuit terminal, the second feeding part 12 of the feeding metal member 1 is electrically connected to the open-circuit contact OC through the open-circuit via VO.

The feeding metal member 1, the feeding terminal FP, the selective terminal ST, the first ground terminal G1, the second ground terminal G2, the third ground terminal G3 and the fourth ground terminal G4 form a balun transmission device.

Figure 5:
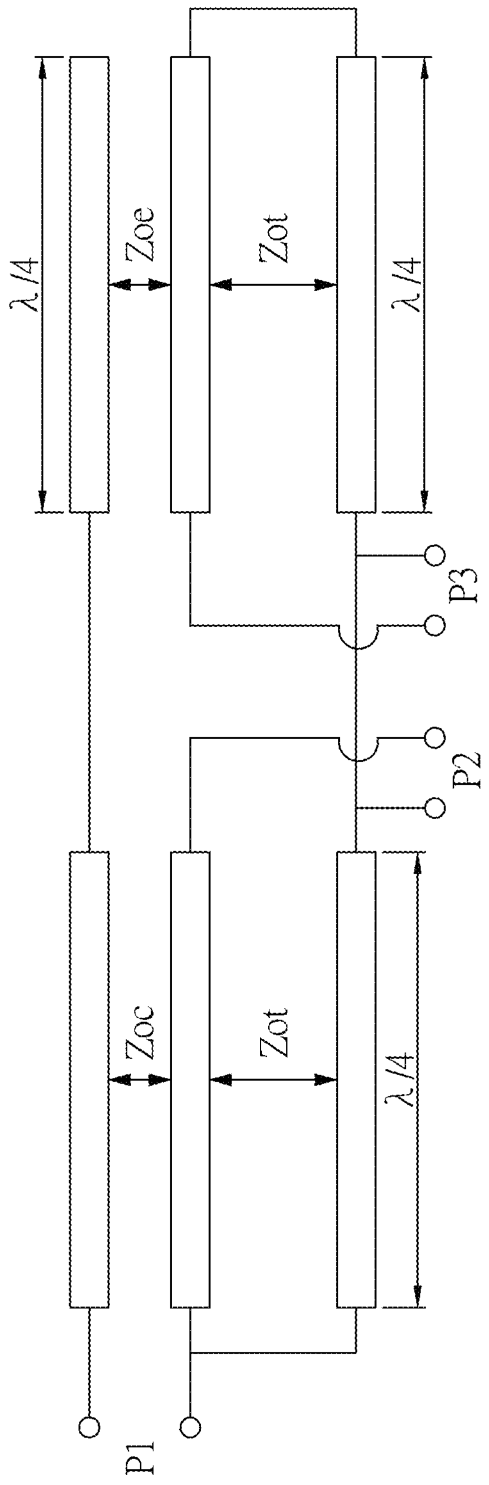
FIG. 5 is an equivalent circuit of a compensated balanced-unbalanced converter (balun) used in the first embodiment of the present disclosure.

FIG. 5 shows an equivalent circuit of a compensated balanced-unbalanced converter (Balun) used in the first embodiment of the present disclosure. The compensation type Balun includes an unbalanced transmission line Zoc connected to an unbalanced port P1, two quarter-wave inductive transmission lines Zot with one end being short-circuited, and a quarter-wave capacitive transmission line Zoe with one end being open-circuited. Signals from balanced ports P2 and P3 have equal magnitude and a phase difference of 180°, and the balanced ports P2 and P3 are connected to a gap below a joint point between the unbalanced transmission line Zoc and the capacitive transmission line Zoe with one end being open-circuited.

The unbalanced port P1 corresponds to the feeding terminal FP, and an upper path used to form the unbalanced transmission line Zoc and the transmission line Zot with one end being open-circuited corresponds to a path from the feeding terminal FP through the feeding metal member 1 to the selective terminal ST (i.e., the open-circuit terminal). The balanced port P2 corresponds to the first ground terminal G1 and the second ground terminal G2 of the first radiating metal member 2, and is used to form an upper path and a lower path of one of the inductive transmission lines Zot. The balance port P3 corresponds to the third ground terminal G3 and the fourth ground terminal G4 of the second radiating metal member 3, and is used to form an upper path and a lower path of another inductive transmission line Zot.

In addition, based on the compensation type Balun, the balanced-unbalanced transmission device, the first radiating metal member 2, and the second radiating metal member 3 further form a symmetrical structure, thereby forming the balanced dipole antenna provided by the present disclosure.

It should be noted that the balanced dipole antenna of the present embodiment operates based on an edge coupling mechanism. In order to excite the balanced dipole antenna, the feeding via VF and the two first ground vias V1 adjacent to the feeding via VF form a ground-signal-ground transmission line structure, while the open-circuit via VO on the other side and the two first ground vias V1 adjacent to the open-circuit via VO also form a ground-signal-ground transmission line structure.

Figure 6:
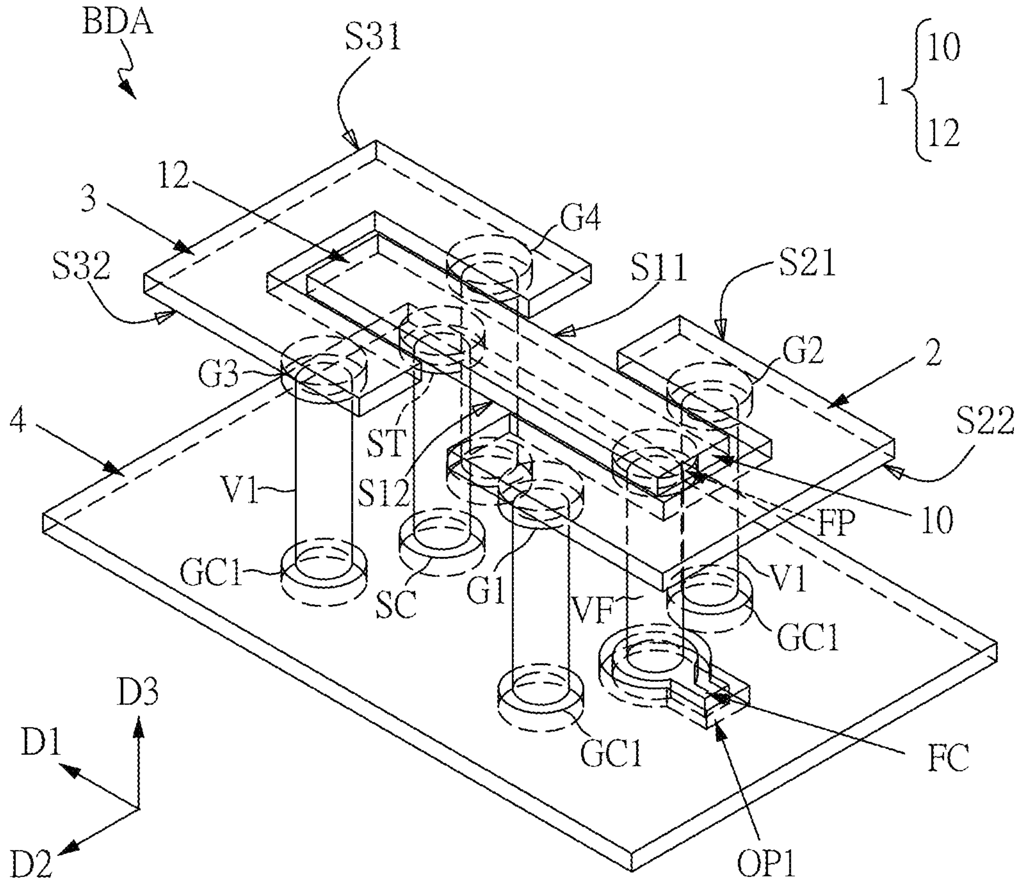
FIG. 6 is another perspective schematic diagram of the balanced dipole antenna of the first embodiment of the present disclosure.
Figure 7:
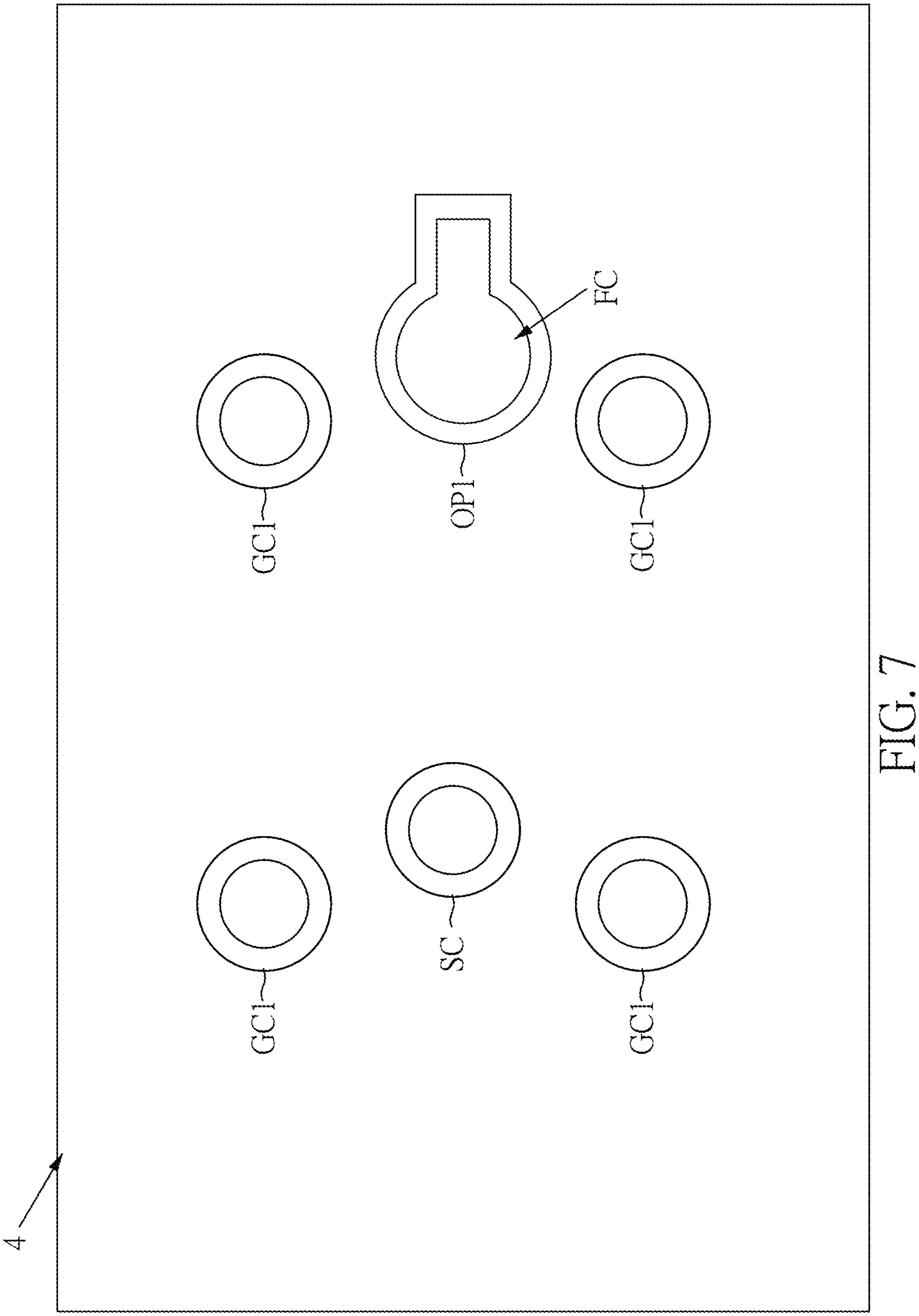
FIG. 7 is another schematic top view of the second metal layer of the first embodiment of the present disclosure.

Reference is made to FIGS. 6 and 7, where FIG. 6 is another perspective schematic diagram of the balanced dipole antenna of the first embodiment of the present disclosure, and FIG. 7 is another schematic top view of the second metal layer of the first embodiment of the present disclosure. In detail, FIGS. 6 and 7 show a configuration in which the selective terminal is a short-circuit terminal. The difference between FIGS. 6 and 7 and FIGS. 1 and 4 is that the second opening OP2 is excluded from the first ground metal member 4 and replaced with a short-circuit contact SC.

In this embodiment, when the selective terminal ST is a short-circuit terminal, the second feeding part 12 of the feeding metal member 1 can be electrically connected to the short-circuit contact SC through a short-circuit via VS. The short-circuit contact SC can be defined as being short-circuited with the first ground metal member 4, such that the short-circuit contact SC is basically similar to the first ground contact GC1.

It should be noted that, although the short-circuit terminal is not described in the equivalent circuit of the compensation type Balun, the short-circuit terminal substantially increases inductance characteristics of the inductive transmission line Zot and still allows the balanced dipole antenna BDA of the present disclosure to operate normally, while improving the overall gain with a slight shift in bandwidth.

Second Embodiment

Figure 8:
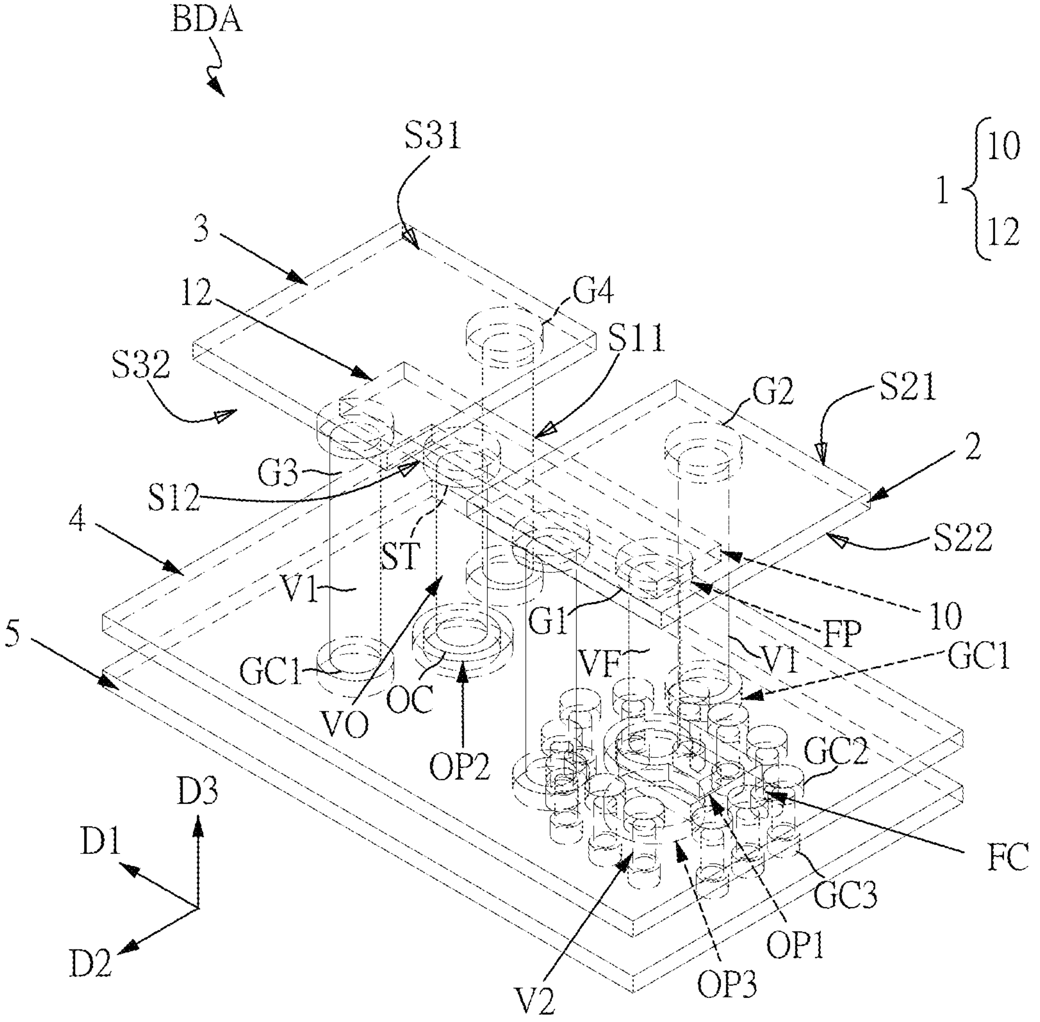
FIG. 8 is a perspective schematic diagram of a balanced dipole antenna according to a second embodiment of the present disclosure.
Figure 9:
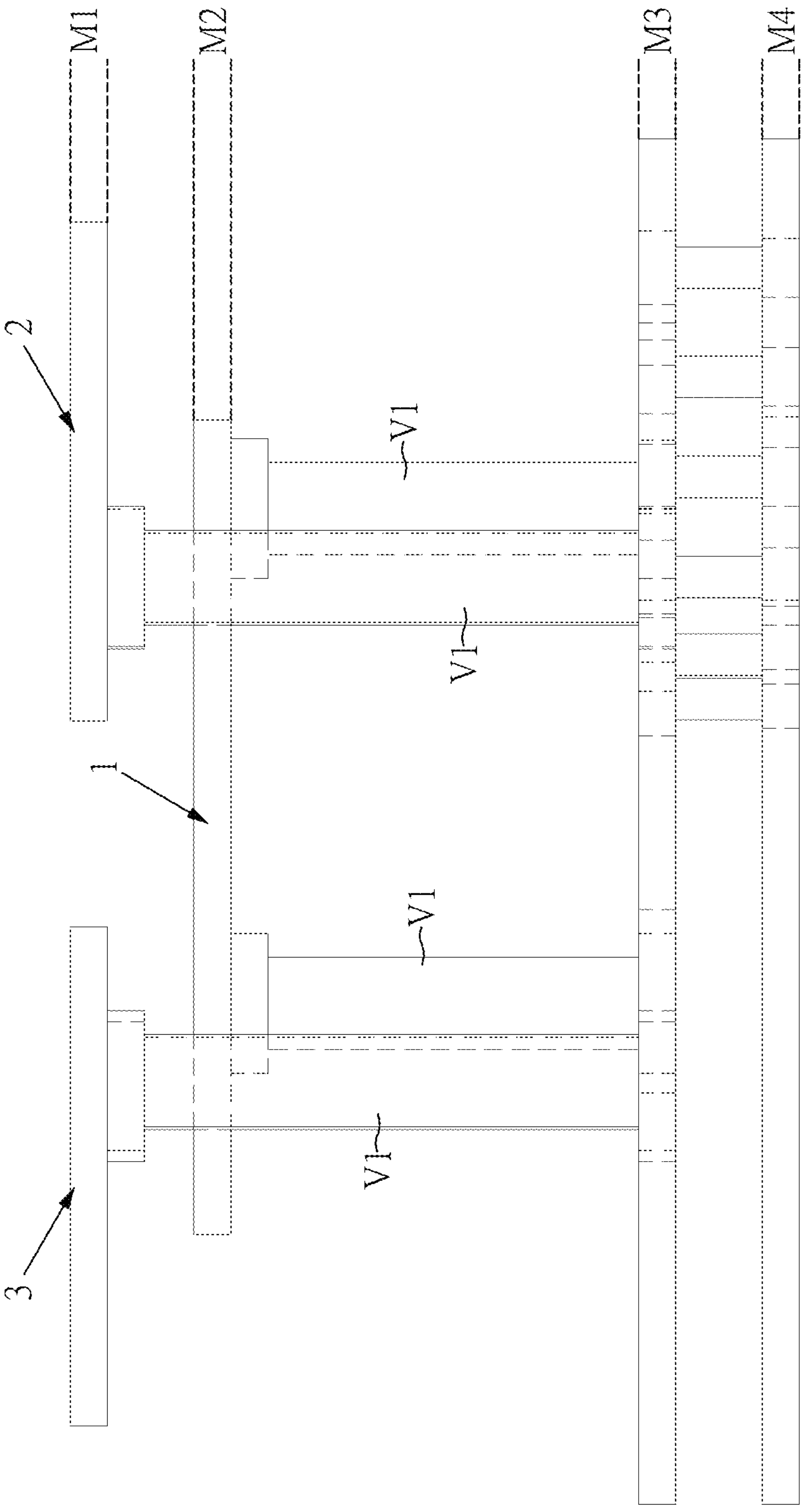
FIG. 9 is a front view schematic diagram of a balanced dipole antenna according to the second embodiment of the present disclosure.
Figure 10:
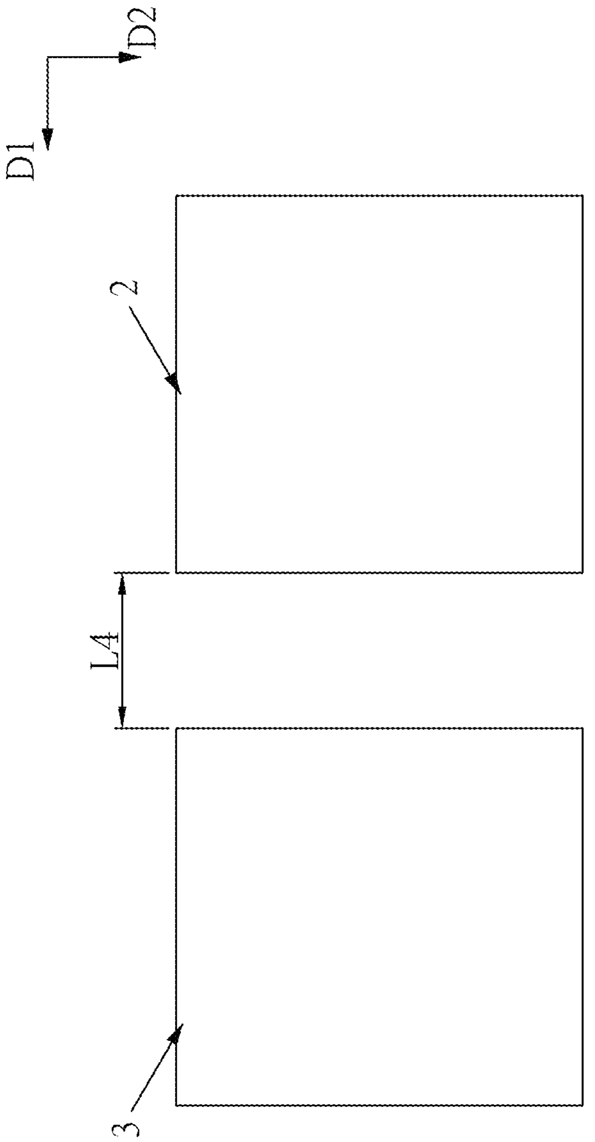
FIG. 10 is a schematic top view of a first metal layer of the second embodiment of the present disclosure.
Figure 11:
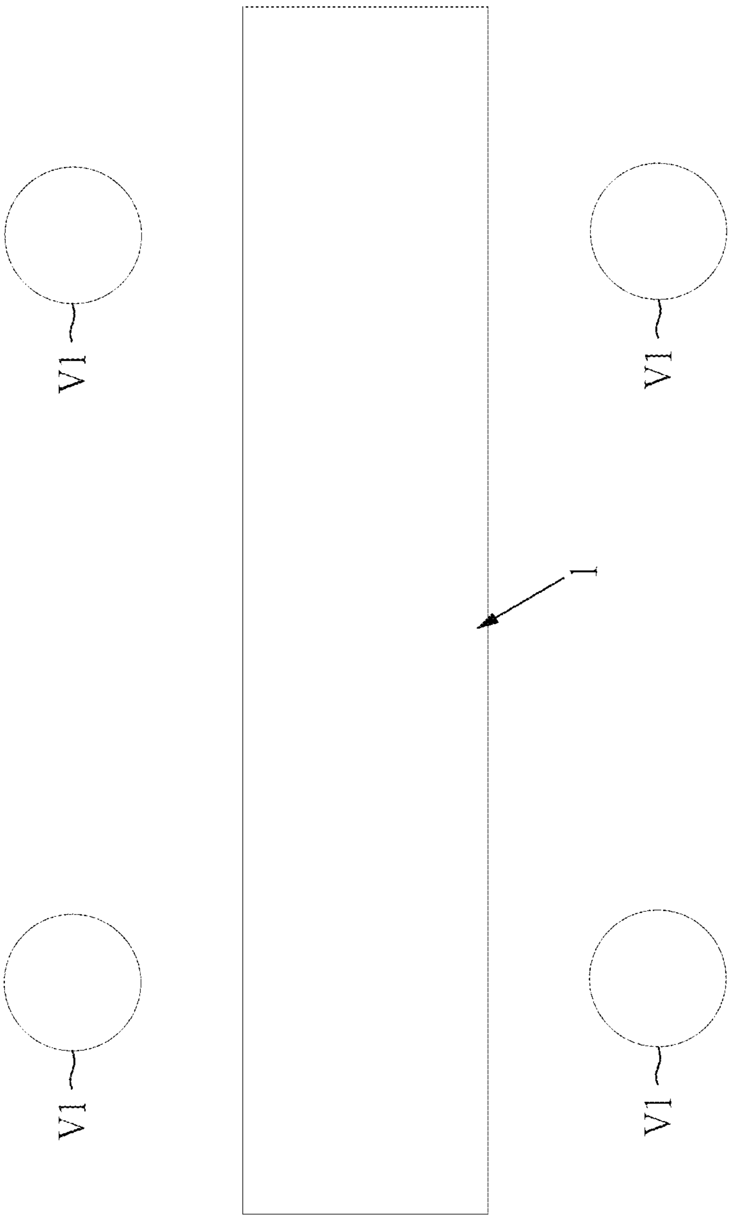
FIG. 11 is a schematic top view of a second metal layer of the second embodiment of the present disclosure.
Figure 12:
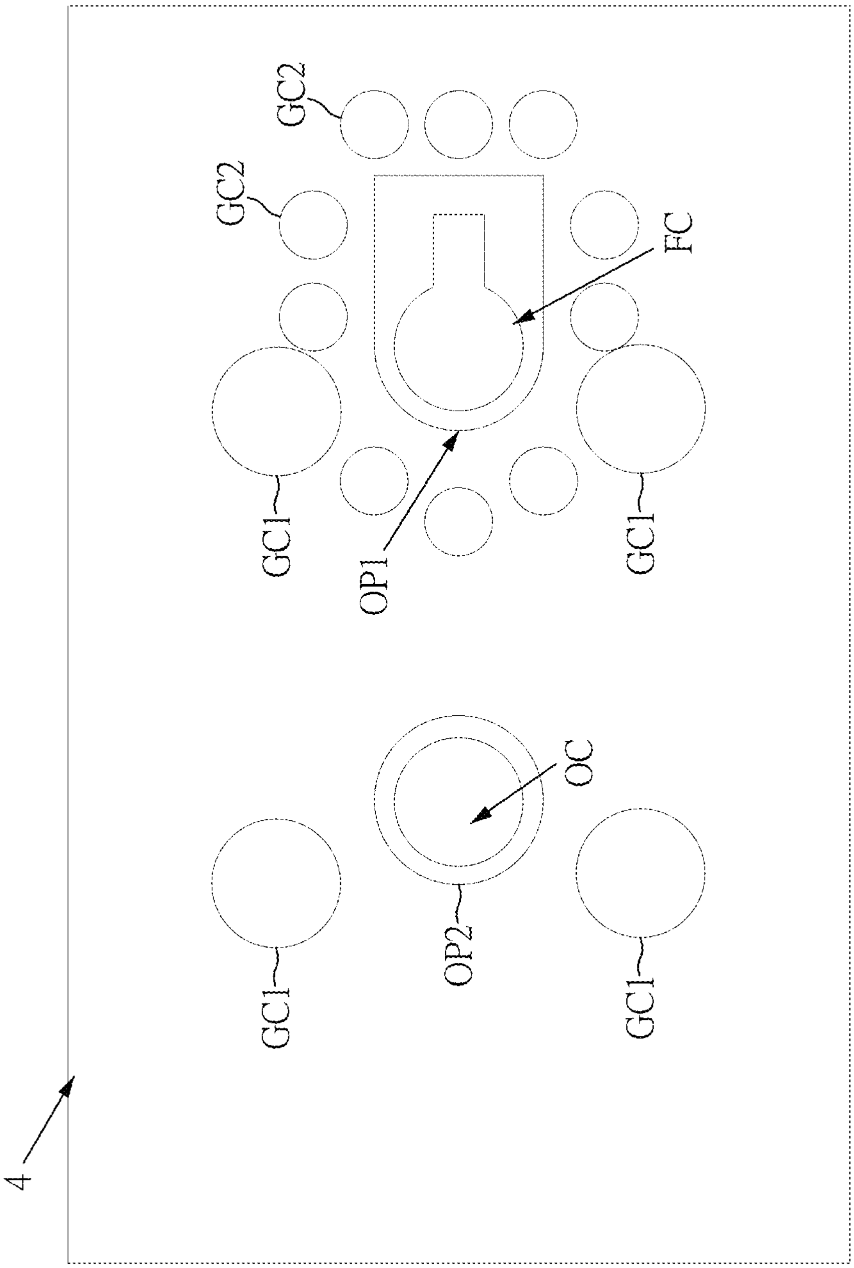
FIG. 12 is a schematic top view of a third metal layer of the second embodiment of the present disclosure.
Figure 13:
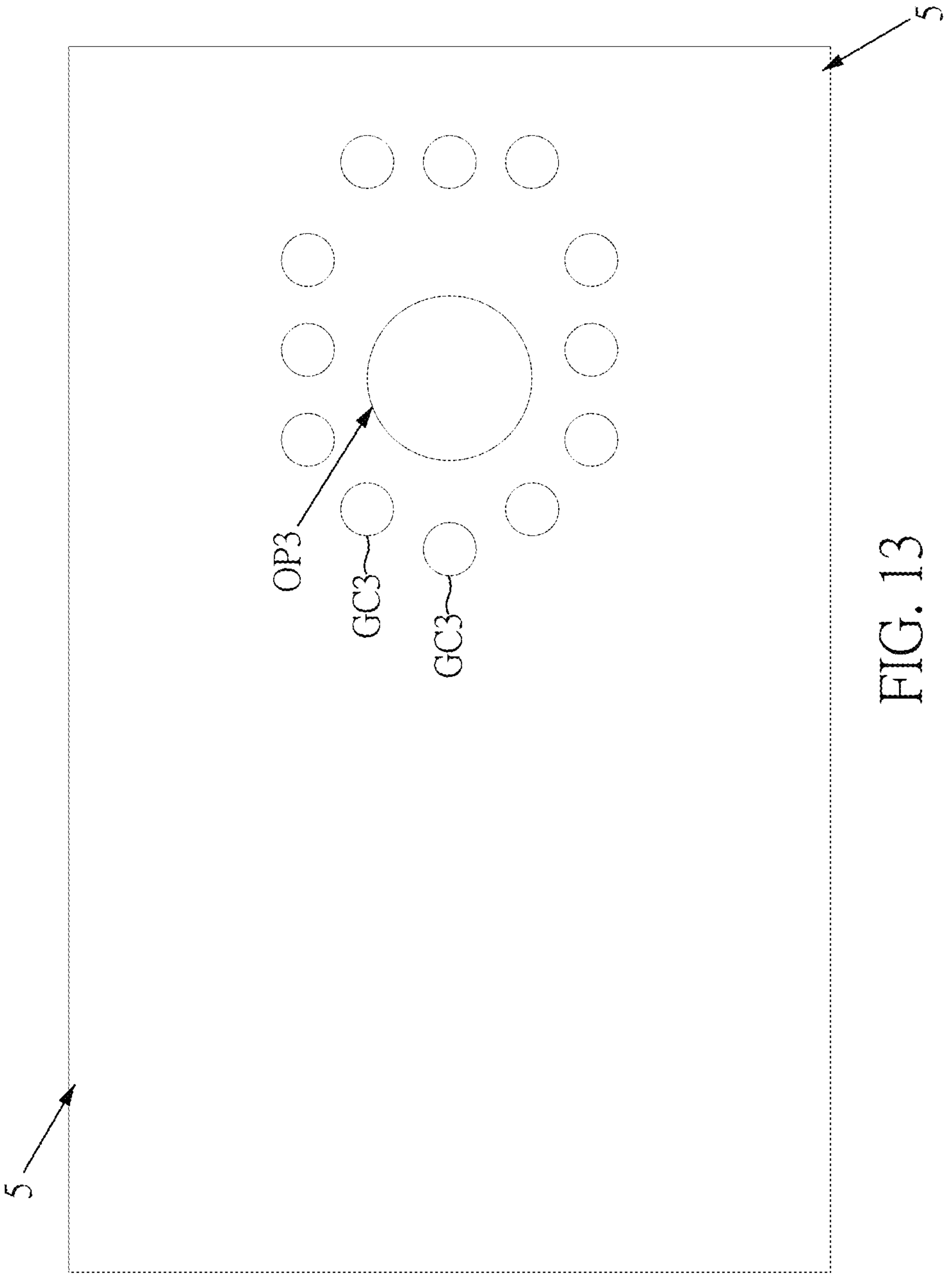
FIG. 13 is a schematic top view of a fourth metal layer of the second embodiment of the present disclosure.

FIG. 8 is a perspective schematic diagram of a balanced dipole antenna according to a second embodiment of the present disclosure. FIG. 9 is a front view schematic diagram of a balanced dipole antenna according to the second embodiment of the present disclosure. FIG. 10 is a schematic top view of a first metal layer of the second embodiment of the present disclosure. FIG. 11 is a schematic top view of a second metal layer of the second embodiment of the present disclosure. FIG. 12 is a schematic top view of a third metal layer of the second embodiment of the present disclosure. FIG. 13 is a schematic top view of a fourth metal layer of the second embodiment of the present disclosure.

Referring to FIG. 8, the second embodiment of the present disclosure further provides a balanced dipole antenna BDA capable of achieving high bandwidth and miniaturization, and the balanced dipole antenna BDA includes a feeding metal member 1, a first radiating metal member 2, a second radiating metal member 3, a first ground metal member 4 and a second ground metal member 5.

In the present embodiment, the feeding metal member 1 can be made of, for example, a conductive metal material, and can be a strip-shaped metal member extending along the first direction D1. The feeding metal member 1 can include a first feeding part 10 and a second feeding part 12. The first feeding part 10 is connected to the second feeding part 12. The first feeding part 10 is connected to a feeding terminal FP, and the second feeding part 12 is connected to a selective terminal ST.

Specifically, the feeding metal member 1 includes a first surface S11 and a second surface S12 facing each other, and electrical contacts serving as the feeding terminal FP and the selective terminal ST are disposed on a second surface S12. The feeding terminal FP is used to receive a feeding signal from the second surface S12 of the feeding metal member 1. In addition, the feeding terminal FP can be disposed at one end of the strip-shaped metal member, and the selective terminal ST can be disposed near the center of the strip-shaped metal member and shifted toward the other end of the strip-shaped metal member.

In addition, the first radiating metal member 2 can be made of, for example, a conductive metal material and can have a patch structure. The first radiating metal member 2 is disposed adjacent to the first feeding part 10 and has a first ground terminal G1 and a second ground terminal G2. The first radiating metal member 2 has a first surface S21 and a second surface S22 opposite to each other. The second surface S22 is provided with electrical contacts serving as the first ground terminal G1 and the second ground terminal G2.

The second radiating metal member 3 can be made of, for example, a conductive metal material, and can have a patch structure similar to that of the first radiating metal member 2. The second radiating metal member 3 is disposed adjacent to the second feeding part 12 and has a third ground terminal G3 and a fourth ground terminal G4. The second radiating metal member 3 is similar to the first radiating metal member 2 and has a first surface S31 and a second surface S32 opposite to each other. The second surface S32 is provided with electrical contacts serving as the third ground terminal G3 and the fourth ground terminal G4.

It should be noted that the present embodiment is different from the first embodiment in that the feeding metal member 1 is located below the first radiating metal member 2 and the second radiating metal member 3, and above the first ground metal member 4. In addition, the first radiating metal member 2 overlaps with the first feeding part 10 of the feeding metal member 1, and the second radiating metal member overlaps with the second feeding part 12 of the feeding metal member 1, and the first radiating metal member 2 and the second radiating metal member 3 are arranged along the first direction D1 and are separated by a fourth distance L4.

The balanced dipole antenna BDA further includes a first ground metal member 4, which can be made of a conductive metal material and is disposed below the feeding metal member 1, the first radiating metal member 2 and the second radiating metal member 3. Reference is made to FIGS. 9 to 11. The first radiating metal member 2 and the second radiating metal member 3 are coplanarly arranged in the first metal layer M1, the feeding metal member 1 is arranged in the second metal layer M2, the first ground metal member 4 is arranged in the third metal layer M3, and the second ground metal member 5 is arranged in the fourth metal layer M4. The first metal layer M1, the second metal layer M2, the third metal layer M3 and the fourth metal layer M4 can be four conductive layers of a printed circuit board, and a dielectric layer can be disposed between any two adjacent ones of the first metal layer M1, the second metal layer M2, the third metal layer M3 and the fourth metal layer M4. However, the above example is only one feasible embodiment and is not intended to limit the present disclosure.

As shown in FIGS. 8, 9 and 12, a plurality of first ground contacts GC1 are disposed on the first ground metal member 4, and the first ground terminal G1, the second ground terminal G2, the third ground terminal G3 and the fourth ground terminal G4 are respectively connected to a plurality of first ground contacts GC1 through a plurality of first ground vias V1. For example, the first ground terminal G1, the second ground terminal G2, the third ground terminal G3 and the fourth ground terminal G4 can form a plurality of vertical projections onto the first ground metal member 4, and the vertical projections respectively overlap with the corresponding first ground contacts GC1, such that the first ground terminal G1, the second ground terminal G2, the third ground terminal G3 and the fourth ground terminal G4 can be respectively connected to those overlapping with the vertical projections. In the embodiment of the present disclosure, the selective terminal ST can be an open-circuit terminal or a short-circuit terminal. In FIGS. 1 to 4, the selective terminal ST is shown as an open-circuit terminal, and thus is connected to an open-circuit contact OC through an open-circuit via VO. It should be noted that the above content is only an example showing an arrangement of the first ground terminal G1, the second ground terminal G2, the third ground terminal G3, the fourth ground terminal G4 and the selective terminal ST, and the present disclosure is not limited thereto.

As shown in FIGS. 8, 9 and 13, the second ground metal member 5 is arranged below the first ground metal member 4 and is located in the fourth metal layer M4. A plurality of second ground contacts GC2 are arranged around the first opening OP1. The second ground contacts GC2 are respectively connected to a plurality of third ground contacts GC3 arranged on the second ground metal member 5 through a plurality of second ground vias V2, and the second ground metal member 5 is provided with a third opening OP3 surrounded by the third ground contacts GC3.

Reference is further made to FIG. 3, which is a top view of the first metal layer. In more detail, the first radiating metal member 2 and the second radiating metal member 3 each have a C-shaped structure. Taking FIG. 3 as an example, the C-shaped structure of the first radiating metal member 2 includes a first portion 21, a second portion 22 and a third portion 23. The first portion 21 is parallel to the second portion 22 and extends along the first direction D1. The third portion 23 extends along the second direction D2 and is perpendicular to the first portion 21 and the second portion 22. Two ends of the third portion 23 are connected to the first portion 21 and the second portion 22, respectively.

Similarly, the C-shaped structure of the second radiating metal member 3 includes a first portion 31, a second portion 32, and a third portion 33. The first portion 31 is parallel to the second portion 32 and extends along the first direction D1. The third portion 33 extends along the second direction D2 and is perpendicular to the first portion 31 and the second portion 32. Two ends of the third portion 33 are connected to the first portion 31 and the second portion 32, respectively.

In addition, the first radiating metal member 2 and the second radiating metal member 3 are arranged symmetrically with respect to the feeding metal member 1, but the first radiating metal member 2, the second radiating metal member 3 and the feeding metal member 1 are not in direct contact with one another.

It should be noted that the fourth distance L4 can be determined according to design parameters of the balanced dipole antenna BDA. For example, a corresponding operating wavelength λ0 can be obtained according to an operating frequency applicable to the balanced dipole antenna BDA, and the fourth distance L4 can be determined according to the operating wavelength λ0. In one preferred embodiment of the present disclosure, similar to the first distance L1, the fourth distance L4 can range from 0.004 to 0.05 times the operating wavelength λ0.

Referring to FIG. 12, the first ground metal member 4 is provided with a first opening OP1 for accommodating the feeding contact FC and a second opening OP2 for accommodating an open-circuit contact OC, and both the first opening OP1 and the second opening OP2 penetrate the first ground metal member 4. It should be noted that an edge of the first opening OP1 does not contact the feeding contact FC, and an edge of the second opening OP2 does not contact the open-circuit contact OC to ensure electrical isolation. In addition, the first feeding part 10 of the feeding metal member 1 is electrically connected to the feeding contact FC through the feeding via VF. When the selective terminal ST is an open-circuit terminal, the second feeding part 12 of the feeding metal member 1 is electrically connected to the open-circuit contact OC through the open-circuit via VO. In addition, the first opening OP1 is also surrounded by the second ground contacts GC2, thereby ensuring the integrity of the signal when it is fed from the feeding contact FC.

Similar to the first embodiment, the feeding metal member 1, the feeding terminal FP, the selective terminal ST, the first ground terminal G1, the second ground terminal G2, the third ground terminal G3 and the fourth ground terminal G4 form a Balun transmission device. In addition, based on the compensation type Balun, the balanced-unbalanced transmission device, the first radiation metal component 2 and the second radiation metal component 3 further form a balanced dipole antenna with a symmetrical structure.

It should be noted that, since the first radiating metal member 2 and the second radiating metal member 3 each have a complete patch structure, the balanced dipole antenna of the present embodiment operates based on a surface coupling mechanism. In order to excite the balanced dipole antenna, the feeding via VF and the two first ground vias V1 adjacent to the feeding via VF form a ground-signal-ground transmission line structure, while the open-circuit via VO on the other side and the two first ground vias V1 adjacent to the open-circuit via VO also form a ground-signal-ground transmission line structure.

Similar to FIG. 7 of the first embodiment, in this embodiment, when the selective terminal ST is a short-circuit terminal, the second opening OP2 is excluded from the first ground metal member 4 and replaced with a short-circuit contact SC, which is not described in detail herein.

Figure 14:
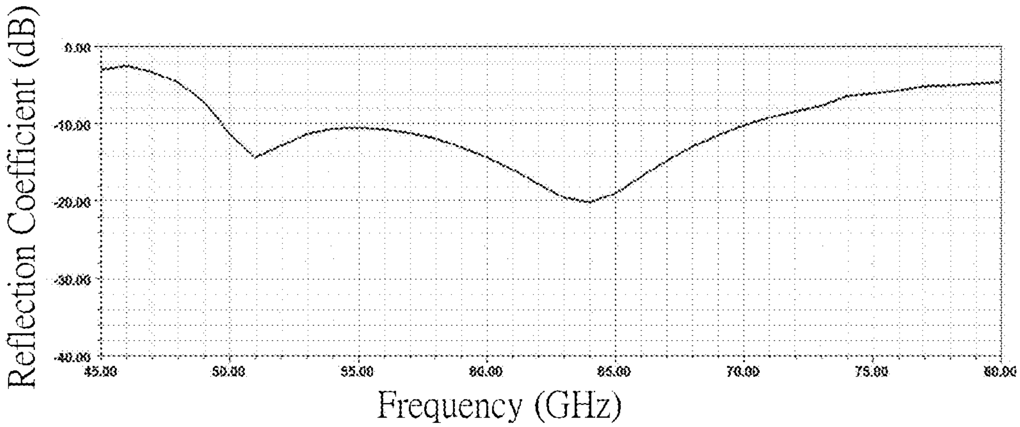
FIG. 14 is a graph showing reflection coefficients versus frequencies of the balanced dipole antenna according to one embodiment of the present disclosure.
Figure 15:
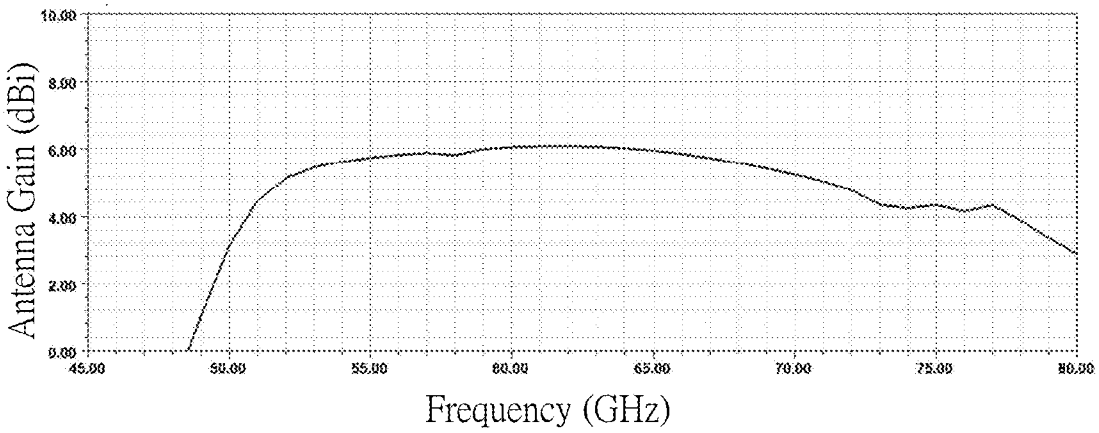
FIG. 15 is a graph showing antenna gains versus frequencies for a balanced dipole antenna according to one embodiment of the present disclosure.
Figure 16:
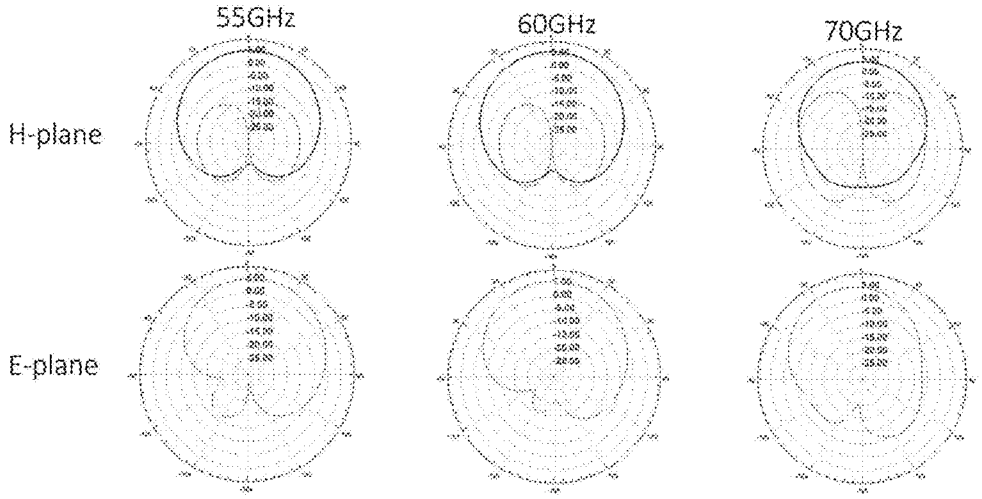
FIG. 16 is a diagram showing antenna patterns on the H-plane and the E-plane of the balanced dipole antenna according to one embodiment of the present disclosure at frequencies of 55, 60, and 70 GHz, respectively.

FIG. 14 is a graph showing reflection coefficients versus frequency of the balanced dipole antenna according to one embodiment of the present disclosure, FIG. 15 is a graph showing antenna gains versus frequencies for a balanced dipole antenna according to one embodiment of the present disclosure, and FIG. 16 is a diagram showing antenna patterns on the H-plane and the E-plane of the balanced dipole antenna according to one embodiment of the present disclosure at frequencies of 55, 60, and 70 GHz, respectively.

As can be seen from the curves of FIG. 14, the balanced dipole antenna of the embodiment of the present disclosure has a wide impedance bandwidth (less than or equal to −10 dB) in the range of 50 to 70 GHz. As shown in FIG. 15, average gain values of the balanced dipole antenna of the embodiment of the present disclosure are greater than 4 dBi within the operating frequency bandwidth of 50 to 70 GHz. In addition, in FIG. 16, the radiation patterns in a wide-area radiation direction does not change much within the operating frequency bandwidths of 55, 60, and 70 GHz, indicating that a unidirectional radiation pattern can be provided stably at various operating frequencies.

Beneficial Effects of the Embodiments

In conclusion, in the balanced dipole antenna with the symmetrical structure provided by the present disclosure, a balanced dipole antenna with a smaller size can be achieved by integrating a balanced-unbalanced transmission device and a symmetrical structure formed by two radiating metal members, and a more compact design is realized by utilizing the edge/surface coupling mechanism. At the same time, the balanced dipole antenna provided by the present disclosure has a wide impedance bandwidth and a large average gain value in the range of 50 to 70 GHz, and can stably provide a unidirectional radiation pattern at various operating frequencies, thereby achieving high bandwidth and miniaturization.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A balanced dipole antenna, comprising:

a feeding metal member including a first feeding part and a second feeding part, wherein the first feeding part is connected to a feeding terminal, and the second feeding part is connected to a selective terminal;

a first radiating metal member disposed adjacent to the first feeding part, wherein the first radiating metal member has a first ground terminal and a second ground terminal;

a second radiating metal member disposed adjacent to the second feeding part, wherein the second radiating metal member has a third ground terminal and a fourth ground terminal; and a first ground metal member disposed below the feeding metal member, the first radiating metal member and the second radiating metal member, wherein the selective terminal is an open-circuit terminal or a short-circuit terminal; and wherein the feeding metal member, the feeding terminal, the selective terminal, and the first ground terminal to the fourth ground terminal form a balun transmission device, and the balun transmission device, the first radiating metal member and the second radiating metal member form a symmetrical structure.

2. The balanced dipole antenna according to claim 1, wherein the feeding metal member, the first radiating metal member and the second radiating metal member are disposed in a first metal layer, and the first ground metal member is disposed in a second metal layer;

wherein the first ground terminal, the second ground terminal, the third ground terminal and the fourth ground terminal are respectively connected to a plurality of first ground contacts on the first ground metal member through a plurality of first ground vias.

3. The balanced dipole antenna according to claim 2, wherein the first radiating metal member and the second radiating metal member each have a C-shaped structure, and the C-shaped structure includes:

a first portion extending along a first direction;

a second portion extending along the first direction and parallel to the first portion; and a third portion extending along a second direction and having two ends connected to the first portion and the second portion, respectively, wherein the feeding metal member is a strip-shaped metal member extending along the first direction.

4. The balanced dipole antenna according to claim 3, wherein the first radiating metal member and the second radiating metal member are arranged symmetrically with respect to the feeding metal member, the first radiating metal member and the first portion of the second radiating metal member are separated by a first distance, and the second portion of the first radiating metal member and the second portion of the second radiating metal member are also separated by the first distance;

wherein each of the first portions is spaced apart from the feeding metal member by a second distance, each of the second portions is spaced apart from the feeding metal member by the second distance, and each of the third portions is spaced apart from the feeding metal member by a third distance;

wherein the first ground metal member is provided with a first opening for accommodating a feeding contact, the first feeding part of the feeding metal member is electrically connected to the feeding contact through a feeding via, and the feeding contact serves as the feeding terminal.

5. The balanced dipole antenna according to claim 4, wherein a second opening for accommodating an open-circuit contact is provided on the ground metal member, and when the selective terminal is the open-circuit terminal, the second feeding part of the feeding metal member is electrically connected to the open-circuit contact through an open-circuit via, and the open-circuit contact serves as the open-circuit terminal.

6. The balanced dipole antenna according to claim 4, wherein a short-circuit contact is provided on the ground metal member, and when the selective terminal is the short-circuit terminal, the second feeding part of the feeding metal member is electrically connected to the short-circuit contact that serves as the short-circuit terminal.

7. The balanced dipole antenna according to claim 1, wherein the feeding metal member is located below the first radiating metal member and the second radiating metal member, and is located above the first ground metal member;

wherein the first radiating metal member and the second radiating metal member are arranged in a first metal layer, the feeding metal member is arranged in a second metal layer, and the first ground metal member is arranged in a third metal layer;

wherein the first ground terminal, the second ground terminal, the third ground terminal and the fourth ground terminal are respectively connected to a plurality of first ground contacts on the first ground metal member through a plurality of first ground vias.

8. The balanced dipole antenna according to claim 7, wherein each of the first radiating metal member and the second radiating metal member has a patch structure, the first radiating metal member overlaps with the first feeding part of the feeding metal member, the second radiating metal member overlaps with the second feeding part of the feeding metal member, and the first radiating metal member and the second radiating metal member are arranged along a first direction and are separated by a fourth distance;

wherein the feeding metal member is a strip-shaped metal member extending along the first direction, a first opening for accommodating a feeding contact is provided on the ground metal piece, and the first feeding part of the feeding metal member is electrically connected to the feeding contact serving as the feeding terminal through a feeding via;

wherein the balanced dipole antenna further comprises a second ground metal member disposed below the first ground metal member and located in a fourth metal layer, wherein a plurality of second ground contacts are disposed around the first opening, the plurality of second ground contacts are respectively connected to a plurality of third ground contacts disposed on the second ground metal member through a plurality of second ground vias, and the second ground metal member is provided with a third opening surrounded by the third ground contacts.

9. The balanced dipole antenna according to claim 8, wherein a second opening for accommodating an open-circuit contact is provided on the ground metal member, and when the selective terminal is the open-circuit terminal, the second feeding part of the feeding metal member is electrically connected to the open-circuit contact serving as the open-circuit end through an open-circuit via.

10. The balanced dipole antenna according to claim 8, wherein a short-circuit contact is provided on the ground metal member, and when the selective terminal is the short-circuit terminal, the second feeding part of the feeding metal member is electrically connected to the short-circuit contact serving as the short-circuit terminal.

* * * * *